June 26, 1951     M. L. PERLMAN ET AL     2,558,377
PREPARATION OF COMPACTS OF HIGH-DENSITY URANIUM HYDRIDE
Filed Nov. 13, 1944
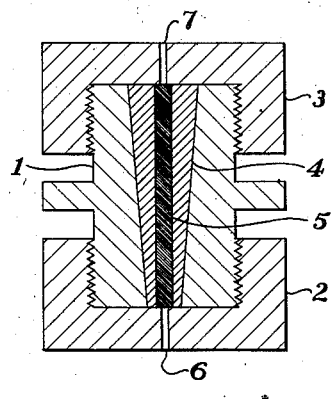
INVENTORS.
Morris L. Perlman
Sam I. Weissman
BY Patented June 26, 1951

2,558,377

UNITED STATES PATENT OFFICE 2,558,377

PREPARATION OF COMPACTS OF HIGH-DENSITY URANIUM HYDRIDE

Morris L. Perlman, New Orleans, La., and Sam I. Weissman, Chicago, Ill., assignors to the United States of America as represented by the United States Atomic Energy Commission Application November 13, 1944, Serial No. 563,294

3 Claims. (Cl. 23—14.5)

1

This invention relates to a method and apparatus for preparing solid metal hydrides and in particular the solid hydrides of the radio active metals. The process is especially adapted to the preparation of solid hydrides of the elements having an atomic number of at least 82.

Heretofore, in the art, it has been customary to prepare the solid hydrides of the radio elements, such as uranium, by heating the radioactive metal powder in a stream of freshly-purified dry hydrogen, or by heating the radioactive metal powder in an atmosphere of dry hydrogen maintained at a pressure in excess of the equilibrium hydrogen pressure at the temperature to which the metal powder is heated (see Driggs, U. S. Patent 1,816,830). Such practice resulted in metal hydride in powder form. The result in the case of the compound uranium hydride (UH$_3$) is a brownish-black or brownish-grey pyrophoric powder, most of which will pass through a four hundred mesh sieve, the absolute density of which is 10.9 grams per cubic centimeter as determined by using a helium displacement or X-ray diffraction method, the bulk density of the dry powder being 3.4 grams per cubic centimeter.

By any of the methods heretofore used it is not possible to obtain compacts of high density (e. g. densities in excess of 9 grams per cubic centimeter) of substantially pure metal hydride such as would eliminate the pyrophoric characteristic of the hydrides of the highly radioactive metals such as uranium or the like; nor was it possible to obtain compacts of high density of substantially pure metal hydride possessing desired geometric shapes where the employment of the nuclear characteristics of the hydride makes such geometric shapes necessary. This was due to the presence of surface adsorbed and absorbed gases which combine with the metal powders used, to form compounds irreducible by hydrogen and thus led to porosity and consequent low average density; and further, to the fact that a preferred orientation of the resulting hydride particles and the bond between such particles could not be obtained by compacting the metal powder before the reaction and/or compacting the hydride powder after the reaction.

One of the objects of this invention is to provide a method for preparing substantially pure metal hydrides.

Another object of this invention is to provide a method for preparing substantially pure metal hydrides of the highly radioactive metals in which the pyrophoric characteristics thereof have been eliminated.

2

Another object of this invention is to provide a method for preparing high density compacts of substantially pure metal hydrides in desired geometric shapes.

Other objects will appear as the invention is more fully disclosed.

In accordance with the objects of the invention and in the practice of it, pure metal in rod or powder form is prepared and a predetermined quantity of the metal incorporated in a strong closed chamber of only slightly greater volume than that of the metal, the same is heated while maintaining about it an atmosphere of pure dry hydrogen at a pressure in excess of the dissociation pressure of the particular metal hydride being formed at the temperature to which the same is being heated. The entire process being carried forward to the resultant high density compact of pure metal hydride.

The invention will be better understood by referring to the accompanying drawing, forming part of the specification, which illustrates a means employed for producing the above-mentioned effect.

The drawing referred to is a longitudinal cross section of one form of the container referred to above. Reference character 1 designates the outer cylindrical casing, preferably made of high tensile steel, having a suitable means such as threads at both ends to engage caps 2 and 3, which are so disposed as to fit tightly against the ends of 1 so as effectively to close such ends and also close the ends of the inner container 4, into which the metal or metal powder 5 is placed. 6 and 7 are vents for the introduction of hydrogen.

The inner container 4 preferably may be tapered to fit a corresponding taper in the outer casing 1, and may be segmented longitudinally so as to render unloading of the finished compact more feasible. The whole assembly is then incorporated in a suitable means (not shown) such as a wire-wound resistance furnace with suitable gas chamber into which hydrogen at a predetermined pressure is introduced and wherein the assembly is heated to a predetermined elevated temperature.

To illustrate the practice of the invention disclosure is made of the method which may be employed in producing uranium hydride compacts from uranium metal.

The inner container 4 is placed in the casing 1 and the cap 3 screwed into place so as to form a cup-shaped receptacle into which a predetermined amount of substantially pure uranium metal, preferably in rod form and previously cleaned by well known means, is then incorporated. The cap 2 is placed in position so as to tightly close the entire assembly which is then heated to a temperature of about 200° C. in a hydrogen atmosphere maintained at a pressure of 300 millimeters of mercury. The amount of hydrogen is measured in a calibrated system and is based upon calculations of the amount necessary to permit the complete reaction of the uranium metal.

By reason of the reaction, the volume of the material present in the container tends to increase as the density changes from that of uranium to that of uranium hydride. By preventing the free expansion of the hydride being formed by confining the same in a fixed volume container, pressure in excess of five tons per square inch is created and is of such a nature as to cause the hydride particles to assume a preferred orientation with respect to one another and results in a compact, upon completion of the reaction, of substantially pure, high density uranium hydride. It may be seen that it is not necessary to fill the contained volume of the cavity in 4 with uranium metal to accomplish these results. In fact, if the container is completely filled with uranium rod, the pressures created are of an extremely high order of magnitude and result in retarding the reaction. To verify this, it has been found that, when the ratio of the weight of uranium in grams to the volume of the container in cubic centimeters is about 13, by the use of the invention, a reaction of more than 90% of the uranium metal to uranium hydride was possible in a short period of time and the density of the hydride compact was about 10 grams per cubic centimeter. This density may be compared with a density of about 8.5 grams per cubic centimeter obtained by compacting uranium hydride powder at pressures in excess of one hundred and fifty tons per square inch.

It has been found that when the ratio of the weight of uranium to the volume of the container is about 19, upon completion of the reaction and before removal of the compact, densities of the order of 15 grams per cubic centimeter for the uranium hydride existed. However, upon removal from the container the compact expands and retains pyrophoric characteristics of finely divided uranium hydride powder. It is found useful, in the case of such compacts, to remove them from the container using well known means to prevent incandescence, e. g. by handling in an inert atmosphere such as carbon dioxide, and to then coat them with an inert material, preferably one high in hydrogen content, low in carbon and which contains small amounts of other elements. Polystyrene, polyethylene or other plastic materials are very suitable for this purpose. This practice substantially eliminates the pyrophoric characteristics and the compact may then be handled readily in air. The use of a material of high hydrogen content is preferable where the nuclear properties of the compact are to be utilized.

Although a preferred means of practicing the invention with regard to uranium metal is described, it may be seen that the present invention may be adapted to the method of manufacture of different metal hydrides, such as plutonium, thorium, neptunium and protoactinium hydrides or mixtures thereof, and high density compacts thereof. It may be seen also that the cavity of the container may be cubic, rectangular, spherical or shape other than the cylindrical described above; and that pressure may be applied to the hydride during the reaction, by a means such as a plunger so disposed as to move axially in the cavity and having a sliding fit therewith. This plunger may be actuated by a means, such as a weight, a lever mechanism or hydraulic system, or the like, in such a manner as to uniformly maintain a predetermined pressure on the hydride during the reaction instead of the increasing pressure resulting from the use of the closed container as hereinabove described. Obviously, there may be modifications of the specific embodiment herein set forth without departing from the nature of the invention as set forth in the following claims.

What we claim is:

1. The method of preparing high density uranium hydride compacts comprising heating uranium metal which is in the form of a plurality of pieces having passages therebetween for access of hydrogen to a temperature in the neighborhood of 200° C. in a hydrogen atmosphere, and confining the hydride volume substantially to the original volume of the metal during the heating period to cause compacting pressures in excess of five tons per square inch to be generated.

2. The method of producing substantially pure, high density compacts of uranium hydride from uranium metal comprising confining the uranium metal which is in the form of a plurality of pieces having passages therebetween for access of hydrogen in a fixed volume container of substantially equal volume to the uranium metal, heating the uranium metal to a temperature of about 200° C. while maintaining a hydrogen atmosphere in the container to effect the formation of uranium hydride which is compacted by the restraining pressure of the container walls as a result of the inherent tendency to growth of the hydride during the formation thereof.

3. The method of preparing high density compacts of uranium and hydrogen which comprises enclosing uranium which is in the form of a plurality of pieces having passages therebetween for access of hydrogen in a container in an amount such that the ratio of the weight of uranium in grams to the volume of the container in cubic centimeters is about 13, heating the uranium to a temperature of about 200° C. and introducing hydrogen into the container under a pressure of about 300 mm. until substantially all of the uranium has been converted to uranium hydride, whereby the uranium hydride formed is compressed into a high density compact by the restraining pressure of the container walls.

MORRIS L. PERLMAN.
SAM I. WEISSMAN.

REFERENCES CITED

The following references are of record in the file of this patent:

UNITED STATES PATENTS

| Number | Name | Date |
|---|---|---|
| 857,146 | Askenasy et al. | June 18, 1907 |
| 1,816,830 | Driggs | Aug. 4, 1931 |
| 1,835,024 | Driggs | Dec. 8, 1931 |
| 2,121,397 | Downing et al. | June 21, 1938 |
| 2,155,499 | Lawson | Apr. 25, 1939 |
| 2,277,393 | Depew | Mar. 24, 1942 |